United States Patent
Staines et al.

(10) Patent No.: US 6,883,627 B1
(45) Date of Patent: Apr. 26, 2005

(54) ENGINE HOOD FOR MOTOR VEHICLES FOR THE PROTECTION OF PEDESTRIANS

(75) Inventors: Bradley Staines, Essex (GB); Bettina Veith, Homburg (DE); Thilo Roeth, Aachen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 09/692,722

(22) Filed: Oct. 19, 2000

(30) Foreign Application Priority Data

Oct. 21, 1999 (EP) .............................. 99121009

(51) Int. Cl.[7] .............................................. B62D 25/10
(52) U.S. Cl. ................. 180/69.2; 280/784; 296/187.04; 296/187.09
(58) Field of Search .................. 180/69.2, 232; 280/751, 752, 784; D12/173; 296/187.03, 187.04, 187.09, 191, 193.11, 35.2, 100.11, 76

(56) References Cited

U.S. PATENT DOCUMENTS

| | | | | |
|---|---|---|---|---|
| 5,115,878 A | * | 5/1992 | Hayata | 180/69.21 |
| 5,124,191 A | * | 6/1992 | Seksaria | 428/178 |
| 5,155,878 A | | 10/1992 | Dellis | |
| 5,706,908 A | * | 1/1998 | Sakai et al. | 180/69.2 |
| 5,988,305 A | * | 11/1999 | Sakai et al. | 296/187.04 |
| 6,179,364 B1 | * | 1/2001 | Takahashi | 296/76 |

FOREIGN PATENT DOCUMENTS

| | | |
|---|---|---|
| JP | 5-155355 | 6/1993 |
| JP | 5-155356 | 6/1993 |
| JP | 8-080873 | 3/1996 |

* cited by examiner

Primary Examiner—Christopher P. Ellis
Assistant Examiner—Christopher Bottorff
(74) Attorney, Agent, or Firm—Gary Smith

(57) ABSTRACT

An engine hood for motor vehicles possesses a deformable head impact zone for the protection of pedestrians in the event of a collision with the motor vehicle. The engine hood is composed of two or more load-bearing shells and has a flexural strength profile which is low adjacent the edges and increases continuously toward the middle of the hood. At the same time, the engine hood has a uniform mass distribution over the entire surface. Consequently, irrespective of the position the engine hood, the same characteristic for the head impact is achieved everywhere. The advantageous embodiment of the engine hood provides a reinforcing panel with regularly arranged beads, at most three beads forming a junction point so as to reduce local rigidities.

15 Claims, 3 Drawing Sheets

ENGINE HOOD FOR MOTOR VEHICLES FOR THE PROTECTION OF PEDESTRIANS

FIELD OF THE INVENTION

The invention relates to an engine hood for motor vehicles, and more specifically to an engine hood having a deformable head impact zone for the protection of pedestrians in the event of a collision with the motor vehicle.

BACKGROUND OF THE INVENTION

When a pedestrian collides with a motor vehicle, a considerable proportion of serious or even fatal injuries is due to the pedestrian's head striking the engine hood. In order to keep this risk of injury as low as possible, the engine hood must be designed to have controlled resilience in the head impact region. U.S. Pat. No. 5,706,908 discloses an engine hood having an energy-absorbing impact body under the outer panel. The design of the engine hood is such that the energy generated during impact against components in the engine space is absorbed by virtue of the outer engine hood panel undergoing ideal deformation to absorb the impact energy. A disadvantage to be seen here is that it is always necessary to have an additional impact body and energy absorption takes place mainly due to local plastic deformation.

Japanese Patent Document 05 155 355 discloses an engine hood stiffened by means of regularly arranged reinforcing profiles, in such a way that it undergoes plastic deformation in a controlled manner in the event of a head impact. The rigid junction points of the reinforcing profiles are weakened by holes and cutouts in order to reduce rigidity peaks in these regions. Here, too, there is the disadvantage that the impact energy is absorbed solely in the form of local plastic deformation. The result of this is that the engine hood has a substantially softer behavior in the middle of the hood as compared with the supported edges of the hood.

SUMMARY OF THE INVENTION

An object of the invention is to provide an engine hood which, in the event of a head impact against any place on the engine hood, always has essentially similar rigidity, in order to implement a uniform deformation behavior over the entire engine hood, taking into account minimal penetration parameters.

The engine hood according to the invention has relatively high flexural strength in its middle region. In the event of a head impact in this region, the momentum of the impact is transmitted to the largest part of the engine hood, that is to say almost the entire mass of the engine hood counteracts the impact and thus leads to the desired deceleration. In the event of a head impact at the edge of the engine hood or adjacent bearers (hinges, locks, stop buffers, etc.) which support the hood relative to the vehicle, the engine hood behaves a priori in a substantially more rigid way, since the nearby bearers form a virtually rigid support. In these regions, therefore, the engine hood is designed with lower flexural strength, with the result that the head impact energy is conducted to only a small part of the engine hood. This leads to lower deceleration due to the mass inertia of the hood and therefore compensates for the rigid behavior of the engine hood at the bearers.

The above-described functioning of the engine hood affords the following profile of flexural strengths: next to the bearers, the flexural strength is predominantly lower than or equal to a first value B1; in the middle region of the hood, the flexural strength is predominantly higher than or equal to a second value B2, B2 being greater than B1; and in the intermediate regions, the flexural strength if predominantly higher than the value B1 and lower than the value B2. This basic profile of flexural strengths can be implemented in various design-related ways.

When the distance between the outer shell and inner shell is constant, the flexural strength may be adapted by the distribution of the shell thicknesses. The sum of all the shell thicknesses is then greater in the middle than at the edges and, in turn, greater at the edges than in the regions directly next to the bearers.

The inventive flexural strength distribution may likewise be achieved by varying the distance between the outer shell and inner shell in the region of the head impact zone. A small distance between the shells is then obtained next to the bearers. This value rises along the edges of the hood between the bearers, and the greatest distance is reached in the middle of the engine hood.

It is also possible to adapt the flexural strength of the hood by varying the modulus of elasticity of the shell materials, most easily when plastics or composite fiber materials are used. A material with a low modulus of elasticity must then be used next to the bearers, while a material with a high modulus of elasticity is used in the middle region of the engine hood.

In the case of the currently conventional sheet-metal form of construction of engine hoods, the inner shells are designed with beads. The beads have flanges which bear against the outer shell and at which the inner shell is connected to the outer shell. Here, too, the inventive flexural strength profile is adopted. Since the beads constitute discrete individual strips, thus making it difficult to calculate the flexural strength of the engine hood, this flexural strength is determined, instead, by means of the inherent rigidities of the beads. This is permissible, because the advantageous embodiment of the engine hood requires a large number of regularly distributed beads.

The desired flexural strength profile is then achieved by adapting the flexural strength of each individual bead. This is determined at a section perpendicular to the neutral axis of the bead, all the load-bearing shells present in this section being taken into account in the calculation. The neutral axis of the bead is a line connecting two junction points where three or more beads converge.

As regards an inner shell with beads, the flexural strength may also be adapted by means of the width of the beads. For this purpose, the beads next to the bearers are designed with a very small width. This width has a higher value at the edges of the engine hood between the bearers, and the width of the beads is greatest in the middle of the engine hood.

The beads are advantageously designed as hat profiles, the profile flanges being connected to the outer shell. The hat profiles of the beads and the convergence of three beads at the junction points combine to achieve a uniform support of the outer shell. Rigidity peaks on the engine hood are consequently avoided.

This has an advantageous effect in the event of a head impact, since there is virtually the same effective engine hood rigidity everywhere in the head impact region.

For the most advantageous design of the engine hood, it is also necessary to have an approximately uniform mass distribution over the surface area of the hood, so that any part of the hood that may be impacted by a head will have a nearly identical mass. The average weight per unit area of the engine hood is obtained by dividing the mass of the engine hood without bearers by the total area of the engine hood. A reference surface element is defined as a circular portion of the hood having a diameter of 25 cm., the approximate size of the contact area of a human head. The weight per unit area of a reference surface element is determined by taking the total mass of all the shells lying below a vertical projection of the reference surface element, and dividing by the area of the reference surface element. The weight per unit area thus obtained for each reference surface element should differ from the average weight per unit area of the engine hood by no more than 20%.

For better adaptation to the flexural strength profile and to the uniform mass distribution, individual regions of the engine hood may also be provided with additional supporting shells arranged between the inner shell and outer shell. When homogeneous supporting shells, such as plastic foams or metal honeycombs, are used, a uniform mass distribution may be achieved by adapting the density of the material of the supporting shells. For this purpose, the material of the supporting shell has different densities as follows: in the middle of the engine hood predominantly a low density, next to the bearers a predominantly high density and at the edges located between the bearers and between the bearers and the middle of the engine hood a medium density.

DESCRIPTION OF THE DRAWINGS

Further clarifications and exemplary embodiments of the invention are explained below with reference to the drawings, in which.

DETAILED DESCRIPTION OF THE PREFERRED EMBODIMENT

Figure 1:
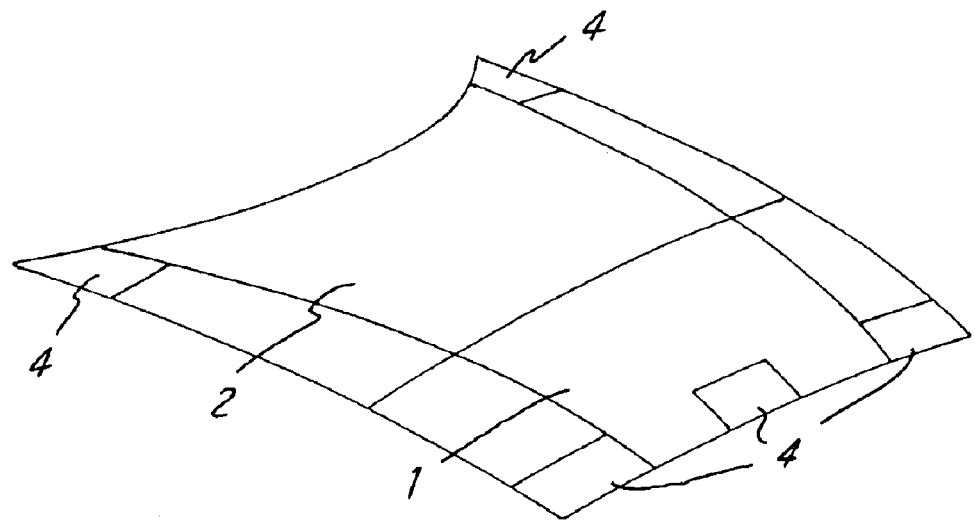
FIG. 1 shows an illustration of the head impact zone on the engine hood.

FIG. 1 shows the typical head impact region 2 for an engine hood 1. In this case, depending on the vehicle type, the front edge 3 of the head impact region is shifted forward to a greater or lesser extent. Also shown are the bearer regions 4 where the engine hood 1 is supported very rigidly relative to the vehicle during the head impact. The bearer regions 4 coincide with components such as hinges, locks, and stop buffers arranged under the engine hood.

Figure 2:
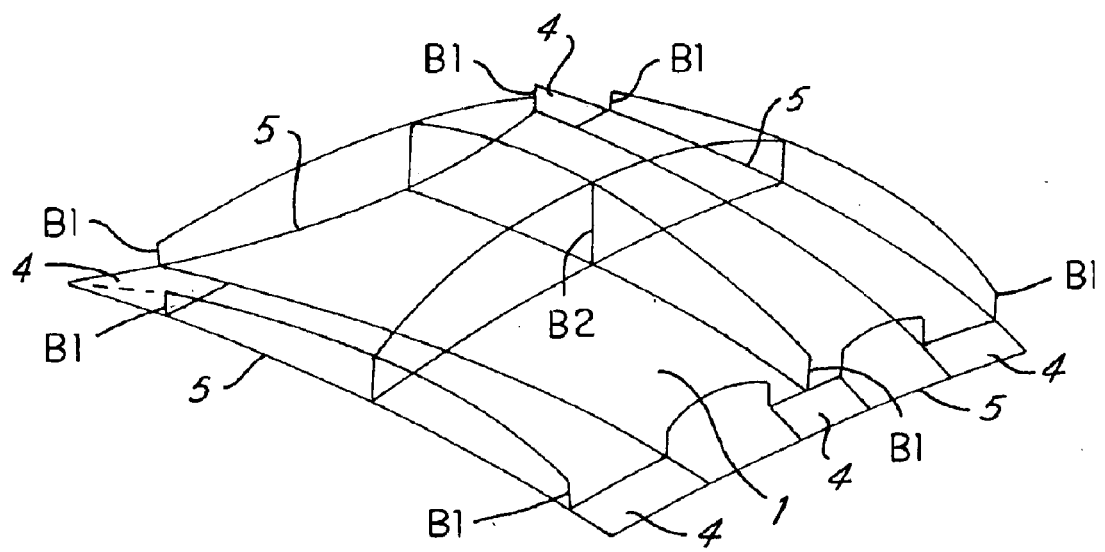
FIG. 2 shows a diagrammatic flexural strength profile over the engine hood.

The general profile of flexural strengths over the engine hood 1 is illustrated in FIG. 2. Adjacent the bearer regions 4, the flexural strength has approximately the value B1; in the middle region, the flexural strength is predominantly higher than or equal to the value B2; and in the regions between the bearer regions 4 and the middle region, the flexural strength is predominantly higher than the value B1 and lower than the value B2. At the same time, the strength profile is to the greatest possible extent continuous.

Figure 3:
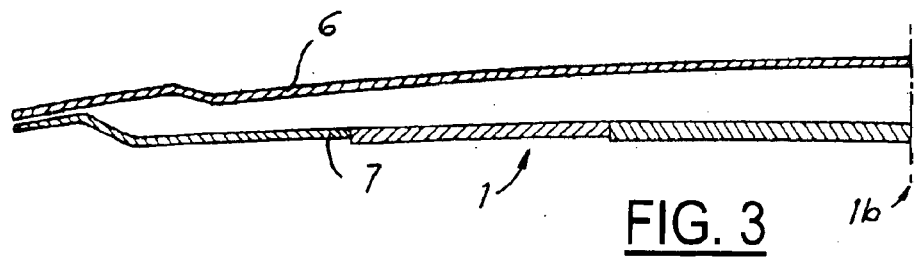
FIG. 3 shows a profile of the shell thicknesses in a cross section through the engine hood.
Figure 4:
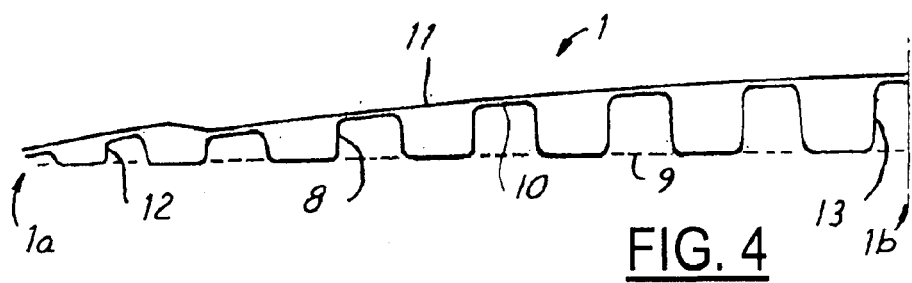
FIG. 4 shows a profile of the shell distances in a cross section through the engine hood.
Figure 5:
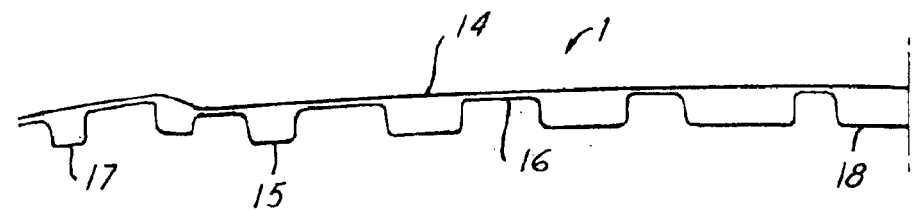
FIG. 5 shows a profile of the bead widths over the cross section of an engine hood.

FIGS. 3 to 5 show, by means of cross sections through the engine hood, several examples of how the flexural strength profile of the hood may be adapted. FIG. 3 illustrates an outer shell 6 and an inner shell 7 having a varying thickness profile. The inner shell 7 is composed of metal sheets of three different thicknesses. This may be achieved by welding together the various sheet-metal thicknesses, as in so-called taylor-welded blanks, or by adhesively bonding individual doubler sheets locally one on the other. In this case, the sheet thickness is the least at the edge and the greatest in the middle of the engine hood. A continuous thickness profile without jumps may be implemented, both for the inner shell and for the outer shell, by means of a component made of plastic or of composite fiber material.

The inner shell 8 in FIG. 4 is stiffened by means of regular beads 9 which all have the same width. The inner shell 8 is connected to the outer shell 11 at the upper bead flanges 10. The flexural strength is adapted by varying the height of the beads 9: the height 12 is small at the edge of the engine hood, while the height 13 is greatest in the middle of the engine hood.

The section through the engine hood in FIG. 5 shows basically the same makeup as in FIG. 4. The outer shell 14 and inner shell 15 are connected via the bead flanges 16. The flexural strengths are adapted by varying the width of the beads: the bead width is small at the edge of the engine hood, as indicated at 17, and the bead width is greatest in the middle of the engine hood, as indicated at 18. The flexural strength may also be adapted by means of any desired combination of the methods shown in FIGS. 3, 4 and 5.

Figure 6:
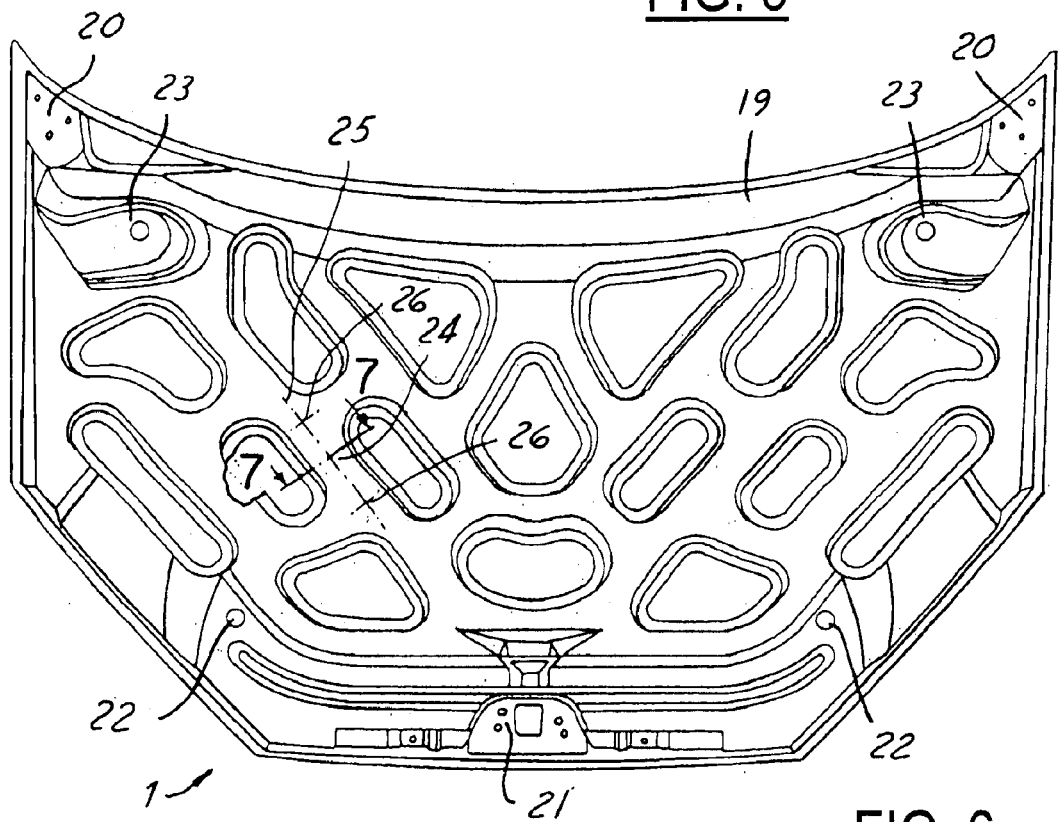
FIG. 6 shows a top view of an engine hood inner shell with beads.

FIG. 6 shows a inner shell 19 for an engine hood in a currently conventional sheet-metal form of construction for motor vehicles, in which the engine hood outer shell (not shown) is typically crimped together with the inner shell 19 and adhesively bonded to the latter. In the event of a head impact, the hinge regions 20, the lock region 21 and the region of the stop buffers 22 act as bearers, rigidly supporting the hood relative to the vehicle and thus limiting deflection of the hood. In addition, plastic deformation regions 23 are provided at the location of the shock absorber strut domes. In the event of a head impact in these regions, the deformation regions 23 absorb the energy of the impact and thereby provide a degree of protection from the rigid shock absorber strut.

The bead pattern of the inner shell 19 is composed of a large number of individual beads. Any point at which three or more beads converge is defined as a junction point, two of which are indicated by way of example by reference numbers 26. By virtue of their geometry, junction points 26 act as rigid local reinforcements, which should be avoided as far as possible in the head impact region.

Figure 7:
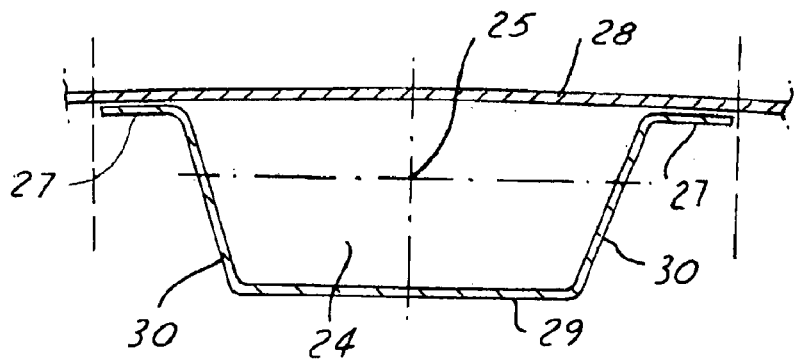
FIG. 7 shows a cross-section taken along line 7—7 of FIG. 6.

The cross section of bead 24 is illustrated by way of example in FIG. 7. This section is taken perpendicular to an imaginary axis 25 connecting junction points 26. Inner shell 19 is adhesively bonded to the outer shell 28 via the bead flanges 27. The width of the bead 24 is obtained from the dimensions of the bead bottom 29 and the height from the dimensions of the bead webs 30. Together with the thicknesses of the outer shell 28 and of the inner shell 19, the flexural strength for the bead in this section can be calculated using these dimensions and known structural analysis formulae. The flexural strength thus determined at the locations of the individual beads is used to determine the flexural strength profile of the hood.

Figure 8:
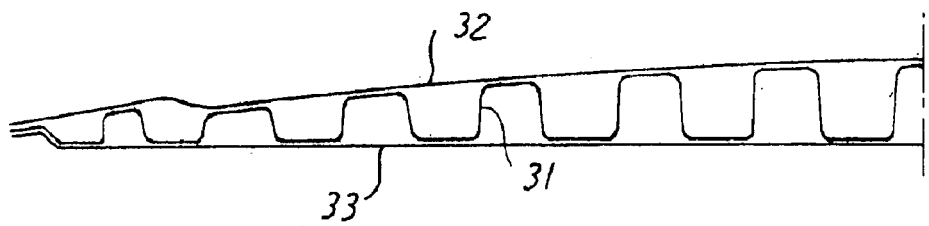
FIG. 8 shows a cross-section through an engine hood with an additional supporting shell.

FIG. 8 shows a cross section through an engine hood with an additional supporting shell 31 disposed between the outer shell 32 and the inner shell 33. Since the supporting shell 31 fulfills essentially a supporting function, it may be designed as a thin-walled shell, stiffened by means of beads or cups, or else as a homogeneous shell consisting of a material of low specific gravity.

Figure 9:
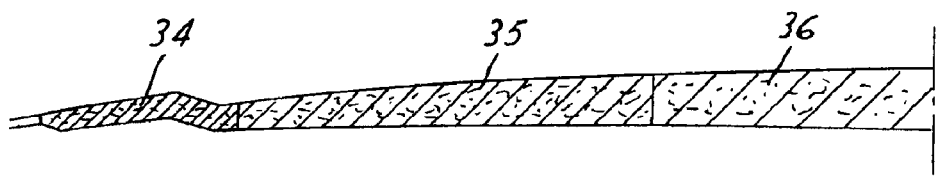
FIG. 9 shows a cross section through an engine hood with a homogeneous supporting shell of varying density.

FIG. 9 shows, in cross section, a supporting shell formed of a homogeneous material, such as plastic foam or metal honeycomb, with the density of the material varying over the area of the engine hood. For this purpose, the supporting shell is divided into three regions: the supporting shell has a high specific density in the edge region 34 of the engine hood, a medium specific density in the inner region 35 and a low specific density in the middle region 36 of the engine hood. This varying density profile allows the engine hood to have an approximately uniform mass distribution over the surface area of the hood, so that any part of the hood that may be impacted by a head will have a nearly identical mass.

Figure 10:
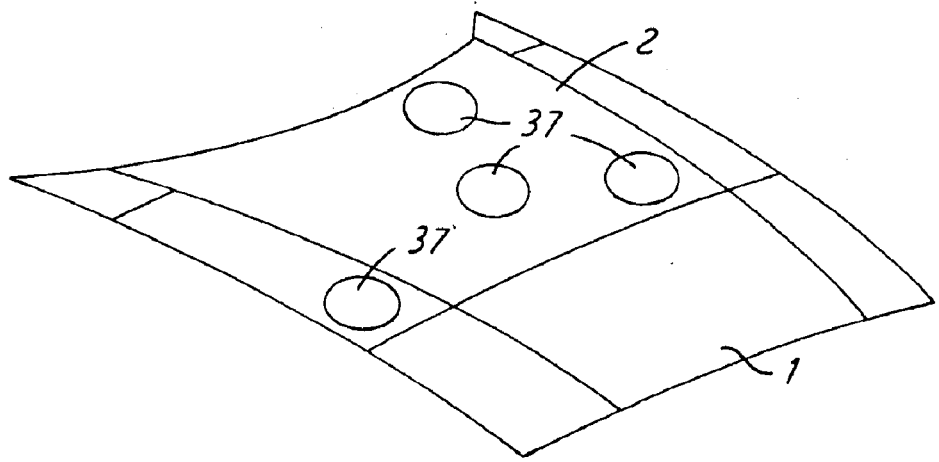
FIG. 10 shows a view of the engine hood for determining the uniform mass distribution.

FIG. 10 shows how the uniform mass distribution described above is checked for the head impact region 2 of the engine hood 1. A reference surface element 37 is defined as a circular portion of the hood having a diameter of 25 cm., the approximate size of the contact area between a human head and the hood. The weight per unit area of a reference surface element 37 is determined by taking the total mass of all the shells lying below a vertical projection of the reference surface element, and dividing by the area of the reference surface element. Reference surfaces 37 may be defined at any desired position in the head impact region 2. Preferably, the weight per unit area of the reference surface element should differ from the averaged weight per unit area of the engine hood itself by no more than 20%. The average weight per unit area of the engine hood is obtained by dividing the mass of the engine hood without bearers by the total area of the engine hood.

Various other modifications and variations will no doubt occur to those skilled in the arts to which this invention pertains. Such variations and modifications, which generally rely on the teachings through which this disclosure has advanced the art, are properly considered within the scope of this invention. This disclosure should thus be considered illustrative, not limiting; the scope of the invention is instead defined by the following claims.

What is claimed is:

1. An engine hood for a motor vehicle having a body, the engine hood having a deformable head impact zone for the protection of pedestrians in the event of a collision with the motor vehicle and comprising an outer shell and an inner shell, the engine hood being supported relative to the body at bearer regions adjacent at least two opposite edge regions of the engine hood, wherein the engine hood has a flexural strength profile in the head impact zone, the flexural strength profile varying over both a longitudinal dimension and a lateral dimension of the engine hood according to the following:

adjacent the bearer regions, a flexural strength predominantly lower than or equal to a first value;

in a middle region of the engine hood, a flexural strength predominantly higher than or equal to a second value, the second value being greater than the first value; and in intermediate regions between the bearer regions and the middle region, a flexural strength predominantly higher than the first value and lower than the second value.

2. The engine hood as claimed in claim 1, wherein the outer shell has a first thickness and the inner shell has a second thickness, a sum of the first and second thicknesses in the head impact zone having a value profile according to the following:

adjacent the bearer regions predominantly lower than or equal to a first thickness;

in a middle region, predominantly higher than or equal to a second thickness, the second thickness being greater than the first thickness; and in intermediate regions between the bearer regions and the middle region, predominantly higher than the first thickness and lower than the second thickness.

3. The engine hood as claimed in claim 2, wherein, in the region of the bead impact zone, the sum of the shell thicknesses has a generally continuous and rising profile from the bearers to the edges and from the edges to the middle.

4. The engine hood as claimed in claim 1, wherein a distance separates the outer shell and inner shell, the distance varying in the region of the head impact zone in accordance with the following:

adjacent the bearer regions, the distance is predominantly lower than or equal to a first distance;

in a middle region, the distance is predominantly higher than or equal to a second distance, the second distance being greater than the first distance; and in intermediate regions between the bearer regions and the middle region, the distance is predominantly higher than the first distance and lower than the second distance.

5. The engine hood as claimed in claim 4, wherein, in the region of the head impact zone, the distance between the outer shell and the inner shell has a generally continuous and rising profile from the bearers to the edges and from the edges to the middle.

6. The engine hood as claimed in claim 1, wherein at least one of the shells is formed of a material having a modulus of elasticity that varies in the head impact zone according to the following:

adjacent the bearer regions, predominantly lower than or equal to a first modulus of elasticity;

in a middle region, predominantly higher than or equal to a second modulus of elasticity, a second modulus of elasticity being greater than the first modulus of elasticity; and in intermediate regions between the bearer regions and the middle region, predominantly higher than the first modulus of elasticity and lower than the second modulus of elasticity.

7. The engine hood as claimed in claim 6, wherein, in the region of the head impact zone, the modulus of elasticity of the shell material has a generally continuous and rising profile from the bearers to the edges and from the edges to the middle.

8. The engine hood as claimed in claim 1, wherein the inner shell has beads which are connected to the outer shell at bead flanges bearing against the outer shell, and the flexural strength of each bead between two junction points is determined, in the region of the head impact zone, from the dimensions of the bead and of the outer shell at a section perpendicular to a neutral axis of the bead between the two junction points.

9. The engine hood as claimed in claim 8, wherein the beads have the following widths in the region of the head impact zone:

adjacent the bearer regions, predominantly lower than or equal to a first width;

in a middle region predominantly higher than or equal to a second width, the second width being greater than the first width; and in intermediate regions between the bearer regions and the middle region, predominantly higher than the first width and lower than the second width.

10. The engine hood as claimed in claim 9, wherein, in the region of the head impact zone, the width of the beads has a generally continuous and rising profile from the bearers to the edges and from the edges to the middle.

11. The engine hood as claimed in claim 8, wherein, in the region of the head impact zone, the beads are shaped as hat profiles and the junctions of the beads are formed predominantly by three hat profiles converging with one another.

12. The engine hood as claimed in claim 1, wherein, in the region of the head impact zone, the flexural strength of the engine hood has a generally continuous and rising profile from the bearers to the edges and from the edges to the middle.

13. The engine hood as claimed in claim 1, wherein at least one intermediate supporting shell is disposed between the outer shell and the inner shell.

14. The engine hood as claimed in claim 13, wherein the supporting shell has the following different densities:

adjacent a bearer portion predominantly lower than or equal to a first density;

adjacent a middle region predominantly higher than or equal to a second density, the second density being greater than the first density; and in intermediate regions between the bearer regions and the middle region, predominantly higher than the first density and lower than the second density.

15. The engine hood as claimed in claim 1, wherein the engine hood without bearers has an approximately uniform mass distribution such that all reference surface elements that may be defined on the engine hood in the head impact zone, with the exception of the bearer regions, have essentially identical weights per unit area, with a permissible deviation from an average weight per unit area of the engine hood without bearers of not over 20%.

* * * * *